US006716267B2

United States Patent
Lawlor, Sr.

(10) Patent No.: US 6,716,267 B2
(45) Date of Patent: Apr. 6, 2004

(54) MULTI-POSITION, SPRING LOADED FILTER RACK

(75) Inventor: Timothy J. Lawlor, Sr., Philadelphia, PA (US)

(73) Assignee: American Standard International Inc., New York, NY (US)

(*) Notice: Subject to any disclaimer, the term of this patent is extended or adjusted under 35 U.S.C. 154(b) by 46 days.

(21) Appl. No.: 09/982,660

(22) Filed: Oct. 18, 2001

(65) Prior Publication Data
US 2003/0074872 A1 Apr. 24, 2003

(51) Int. Cl.[7] .............................................. B01D 27/06
(52) U.S. Cl. .............................. 55/506; 55/493; 55/497; 55/504; 55/511; 55/517; 55/DIG. 31; 55/DIG. 35
(58) Field of Search ...................... 55/490, 493, 497, 55/504, 506, 511, 517, DIG. 31, DIG. 35

(56) References Cited

U.S. PATENT DOCUMENTS

| 2,062,649 | A | * | 12/1936 | Regan ................... 55/DIG. 31 |
| 2,979,159 | A |   | 4/1961  | Pritchard |
| 4,217,122 | A | * | 8/1980  | Shuler ........................ 55/504 |
| 5,183,488 | A | * | 2/1993  | Deering ................ 55/DIG. 31 |
| 5,312,467 | A |   | 5/1994  | Wolfe |
| 5,458,667 | A |   | 10/1995 | Poggi, Jr. et al. |
| 5,492,551 | A |   | 2/1996  | Wolfe |
| 5,679,121 | A | * | 10/1997 | Kim ............................. 55/506 |
| 5,968,217 | A | * | 10/1999 | Stein et al. ............ 55/DIG. 31 |
| 6,007,596 | A |   | 12/1999 | Rosen |
| 6,033,453 | A | * | 3/2000  | Weddell, III ................ 55/506 |
| 6,284,011 | B1 | * | 9/2001  | Chiang et al. ................ 55/492 |
| 6,354,936 | B1 | * | 3/2002  | Noh et al. .................... 55/492 |

* cited by examiner

Primary Examiner—Minh-Chau T. Pham
(74) Attorney, Agent, or Firm—William J. Beres; William O'Driscoll

(57) ABSTRACT

A filter rack is spring loaded to an expanded position to help hold the filter rack at various positions and orientations within a furnace enclosure. The rack may also include a spring-loaded channel whose position adjusts to receive filters of various widths. One set of springs urge two side members of the filter rack outward, while another set of springs urge the channel inward.

20 Claims, 2 Drawing Sheets

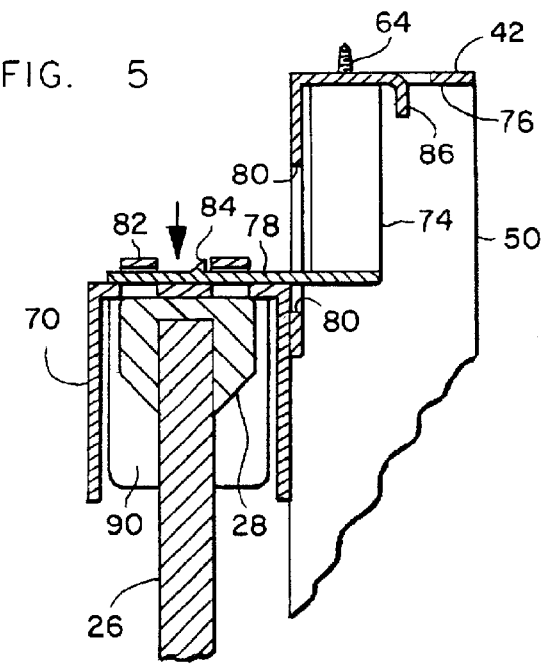
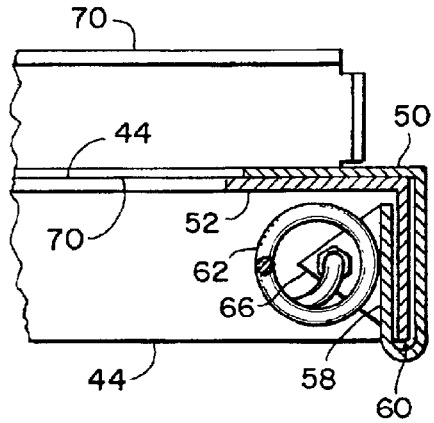
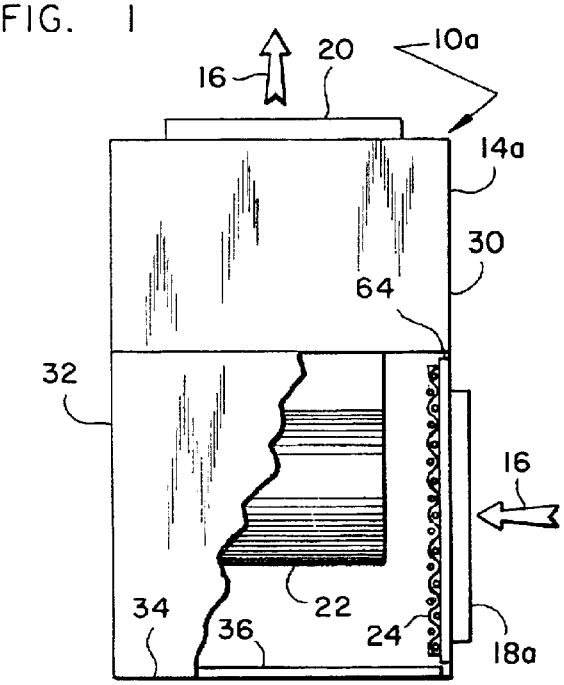
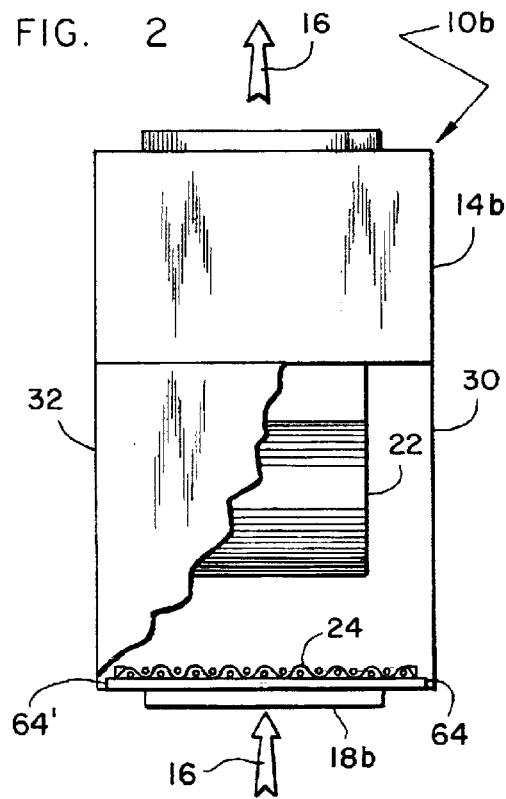

MULTI-POSITION, SPRING LOADED FILTER RACK

BACKGROUND OF THE INVENTION

1. Field of the Invention

The present invention relates to air conditioning and heating systems, and more specifically to a filter rack for holding an air filter of a furnace, heat pump, air conditioner, or other type of air handler.

2. Description of Related Art

Air conditioning systems typically include an air-handler that provides conditioned air to a comfort zone, such as a room or a designated area within a building. The conditioning of the air may include, but not be limited to heating, cooling, humidifying, dehumidifying, filtering, ventilating, and their various combinations. Air handlers often include a sheet metal enclosure that contains various components, such as a blower, filter, heat exchanger, controls, etc.

Air handlers and their enclosures are preferably reconfigureable so they can be readily connected to a building's ductwork. Depending on the application, the building's return air duct may need to be connected to the enclosure's right side, left side, or bottom. Thus, an enclosure may include various knockout or otherwise removable panels that allow a return air opening to be created where needed.

Creating such a return air opening often involves a significant amount of work and may require various tools for cutting, trimming, bending, screwing, etc. This can be especially true when the air handler's return air filter is situated right at the return air opening, which is often the case. Thus, additional work may be required to relocate filter-related hardware, such as a filter rack, which holds the filter.

Once an air handler is properly configured and set up, the filter may be replaced regularly with normal maintenance. In some cases, the actual size of the replacement filter may be slightly different than that of the original filter, even though both filters may have the same nominal size. Slight differences in size may create a gap between the filter and the filter rack, which could allow return air to bypass the filter.

In some cases, the size of a filter may be adjustable, as disclosed in U.S. Pat. Nos. 6,007,596; 5,492,551 and 5,312,467. However, the price of such filters may be relatively expensive, when compared to common disposable filters. Other filter assemblies may use a spring for sealing or for various other purposes, as disclosed in U.S. Pat. Nos. 2,979,159 and 5,458,667. However, such mechanisms may not close off an air gap caused by a rectangular filter whose length or width is too short. Moreover, such mechanisms may complicate the process of reconfiguring an enclosure during the initial installation of the air handler.

SUMMARY OF THE INVENTION

To overcome the limitations of current air handler enclosures, it is an object of the invention to provide a filter rack whose side members are spring biased outward.

Another object to provide a filter rack comprising a side member that is spring biased outward and a filter rail that is spring biased inward.

Another object is to use a leaf spring to act between the side member and the filter rail.

Another object is to use an extension spring to outwardly urge the side members of a filter rack.

Yet, another object is to provide a filter rack with a movable channel for receiving filters of different widths.

A further object is to provide a filter rack with sliding end members that allow the width of the filter rack to be reduced which simplifies the installation of the rack.

A still further object is to connect an extension spring to a pair of sliding end members to urge the members to a greater length.

Another object is to spring load a filter rack into engagement with an air handler enclosure.

Another object is to provide a filter rack whose side members are movable to enable the rack to be installed within an enclosure in various orientations.

These and other objects of the invention are provided by a filter assembly that includes a filter rack adapted to hold a removable filter. The rack is a generally rectangular frame with two opposite sides that are urged apart by a spring. The spring loaded sides help hold the rack within an enclosure of an air handler.

BRIEF DESCRIPTION OF THE DRAWINGS

FIG. 1 is a cutaway view of an air handler in one configuration.

FIG. 2 is a cutaway view of the air handler of FIG. 1, but with the air handler in another configuration.

FIG. 5 is a cross-sectional view taken along line 5—5 of FIG. 4.

FIG. 6 is a cross-sectional view taken along line 6—6 of FIG. 4.

DESCRIPTION OF THE PREFERRED EMBODIMENT

Figures 3, 4:
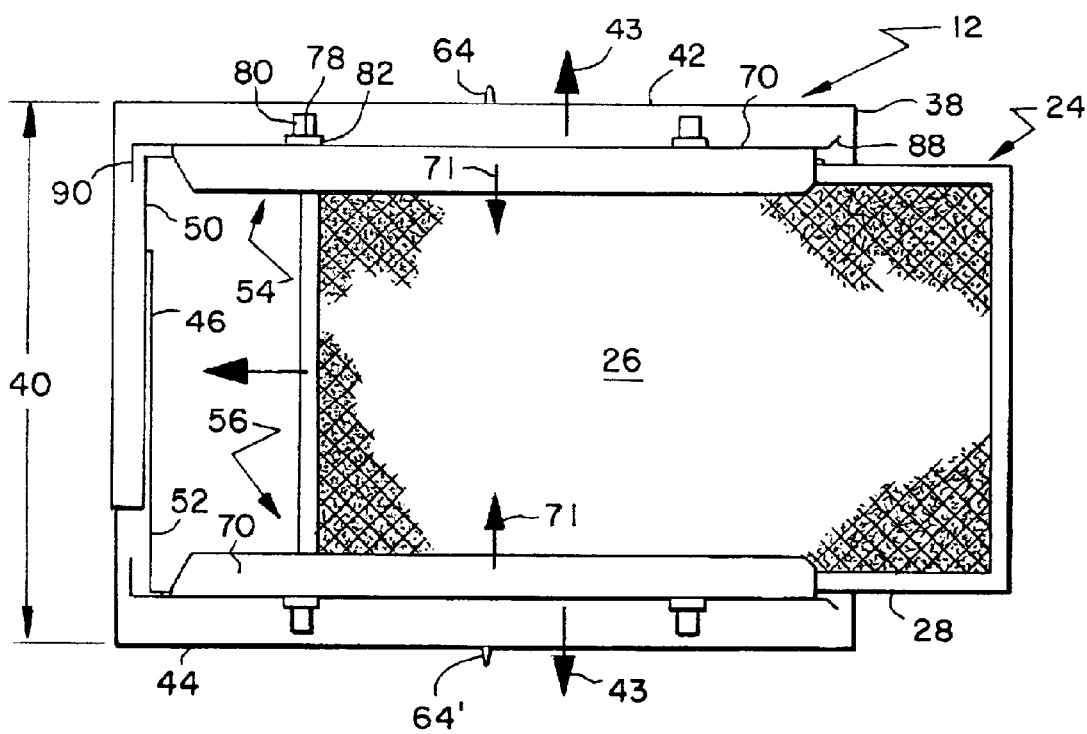
FIG. 3 is a front view of a filter assembly according to one embodiment of the invention, with the filter partially installed.
FIG. 4 is a back view of FIG. 3.

An air handler 10a, shown in FIG. 1, includes a filter assembly 12 that can be mounted in various orientations within an enclosure 14a. Air handler 10a is schematically illustrated to represent any device for moving air 16 between an inlet 18a and an outlet 20 of enclosure 14a for the purpose of heating, ventilating, filtering, humidifying, de-humidifying, or otherwise conditioning the air of a comfort zone, room, or area within a building. Examples of air handler 10a include, but are not limited to, a blower 22 within an enclosure, a furnace, air conditioner, heat pump, and various combinations thereof. For the illustrated embodiment of the invention, a serviceable or disposable air filter 24 (comprising an air permeable medium 26 supported by a filter frame 28) filters air 16 passing through enclosure 14a.

Filter assembly 12 allows filter 24 to be installed along a side 30 or 32 of enclosure 14a, as shown in FIG. 1, or be installed along a bottom 34. For example, enclosure 14a of air handler 10a can be configured to provide an air handler 10b with an enclosure 14b, as shown in FIG. 2. This can be done by removing a bottom panel 36 of enclosure 14a to create modified enclosure 14b having a return air inlet 18b at the bottom. The original side inlet 18a can then be closed off with another panel (e.g., panel 36), or if inlet 18a is already closed, it can be left that way.

To allow filter assembly 12 to be readily installed in various positions within enclosure 14a, assembly 12 includes a generally rectangular filter rack 38 whose length 40 (or width) can expand to match various interior dimensions of enclosure 14a. Filter rack 12 includes two fixed length side members 42 and 44 and two adjustable length end members 46 and 48. To make length 40 adjustable, member 46 comprises two relative sliding members 50 and 52, and, similarly, end member 48 comprises two relative sliding members 50' and 52'.

The actual structure of filter rack 38 can vary; however, in a preferred embodiment of the invention, sliding members 50 and 52' are fixed (e.g., spot welded) to side member 42, and sliding member 50' and 52 are fixed to side member 44. Members 50 and 50' are similar, and so are members 52 and 52'. Thus, an upper half 54 of rack 38 is similar to its lower half 56. An edge 58 on sliding members 50 and 50' is folded over a flange 60 on members 52 and 52' to help keep the members in sliding engagement with each other.

To help hold filter rack 38 in place within enclosure 14a or 14b, at least one spring 62 urges side members 42 and 44 apart from each other, as indicated by arrows 43. The spring force helps hold filter rack 38 into engagement with some predetermined feature of enclosure 14a or 14b. In FIG. 1, for example, a screw 64 protruding from side member 42 engages some upper hole in enclosure 14a, and side member 44 is held in place by bottom panel 36. In FIG. 2, screw 64 and another similar screw 64' engage holes in sides 30 and 32 respectively.

Spring 62 is preferably an extension spring (helical wire, or elastic band or cord); however, other springs such as compression springs, leaf springs, torsion springs, etc., are well within the scope of the invention. Extensions springs are preferred, as they provide relatively large travel without the need for additional structure, such as guides for preventing a compression spring from buckling. Spring 62 is simply stretched between a bent tab 66 extending from sliding member 50 and a hole 68 in sliding member 52.

In some embodiments of the invention, filter assembly 12 includes one or more filter rails 70 that move to match the actual size of filter 24, as opposed to its nominal size. Each rail 70 forms a channel adapted to receive filter frame 28. If only one rail 70 is movable, the rail moves against filter frame 28 by moving toward a central portion of the rectangular shape of filter assembly 38. If two rails 70 are movable, they are urged to move toward each other, as indicated by arrows 71.

One or more leaf springs 72 can be used to urge rails 70 against filter frame 28. Leaf spring 72 includes a stressed bow 74 that abuts a flange 76 of side member 42. A tab 78 extending from a central portion of bow 74 protrudes through a slot 80 in side member 42 and attaches to filter rail 70. Tab 78 runs underneath an offset loop 82 formed of sheet metal in rail 42 and includes a barb 84 that helps hold tab 78 in place. Tab 78 moving within slot 80 defines the travel limit a tab 78 and filter rail 70. Two tabs 86 bent from side member 42 helps hold bow 74 in position.

A lead-in 88 at one end of rail 70 eases the installation of filter 24, and a stop 90 at the opposite end of rail 70 defines the filter's fully installed position.

Although the invention is described with reference to a preferred embodiment, it should be appreciated by those skilled in the art that other variations are well within the scope of the invention. Therefore, the scope of the invention is to be determined by reference to the claims, which follow.

I claim:

1. A filter assembly, comprising:
    a filter that includes an air permeable filter medium supported by a filter frame;
    a filter rack supporting said filter frame, said filter rack comprising two elongated and substantially parallel side members and two elongated and substantially parallel end members, said side members and said end members forming a rectangle;
    a first spring connected to said filter rack and urging said side members apart from each other.

2. The filter assembly of claim 1, further comprising a filter rail attached to said filter rack and being movable relative thereto; and a second spring urging said filter rail against said filter.

3. The filter assembly of claim 2, wherein said second spring is a leaf spring.

4. The filter assembly of claim 1, further comprising a filter rail movably attached to said filter rack, said filter rail defining a channel that holds the filter.

5. The filter assembly of claim 1, further comprising a filter rail movably attached to said filter rack and being spring biased toward a central portion of said rectangle.

6. The filter assembly of claim 1, wherein said first spring is an extension spring.

7. The filter assembly of claim 1, wherein said two end members each include a pair of sliding members that provides each of said two end members with an adjustable length.

8. The filter assembly of claim 7, wherein said first spring is connected to said pair of sliding members.

9. The filter assembly of claim 1, further comprising an enclosure that supports said filter rack with said first spring urging said side members into engagement with said enclosure.

10. The filter assembly of claim 9, wherein said filter rack is selectively attachable to said enclosure at a first location and a second location.

11. The filter assembly of claim 10, wherein said first location and said second location provide two filter orientations that are substantially perpendicular to each other.

12. A filter assembly, comprising:
    a filter that includes an air permeable filter medium supported by a filter frame;
    a filter rack supporting said filter frame, said filter rack comprising two elongated and substantially parallel side members and two elongated and substantially parallel end members, said side members and said end members forming a rectangle;
    a first spring connected to said filter rack and urging said side members apart from each other; and
    an enclosure that supports said filter rack with said first spring urging said side members into engagement with said enclosure.

13. The filter assembly of claim 12, further comprising a filter rail attached to said filter rack and being movable relative thereto; and a second spring urging said filter rail against said filter.

14. The filter assembly of claim 12, further comprising a filter rail movably attached to said filter rack, said filter rail defining a channel that holds the filter.

15. The filter assembly of claim 12, further comprising a filter rail movably attached to said filter rack and being spring biased toward a central portion of said rectangle.

16. The filter assembly of claim 12, wherein said filter rack is selectively attachable to said enclosure at a first location and a second location.

17. The filter assembly of claim 16, wherein said first location and said second location provide two filter orientations that are substantially perpendicular to each other.

18. A filter assembly, comprising:

a filter that includes an air permeable filter medium supported by a filter frame;

a filter rack supporting said filter frame, said filter rack comprising two elongated and substantially parallel side members and two elongated and substantially parallel end members, wherein said side members and said end members form a rectangle and said two end members each include a pair of sliding members that provides said rectangle with an adjustable length;

an extension spring connected to said pair of sliding members and urging said side members apart from each other; and an enclosure that supports said filter rack with said first spring urging said side members into engagement with said enclosure.

19. The filter assembly of claim 18, further comprising a filter rail attached to said filter rack and being movable relative thereto; and a second spring urging said filter rail against said filter.

20. The filter assembly of claim 18, wherein said filter rack is selectively attachable to said enclosure at a first location and a second location, wherein said first location and said second location provide two filter orientations that are substantially perpendicular to each other.

* * * * *